(12) United States Patent
Gustavsson et al.

(10) Patent No.: US 6,629,031 B2
(45) Date of Patent: Sep. 30, 2003

(54) VEHICLE TAMPERING PROTECTION SYSTEM

(75) Inventors: Tommy Gustavsson, Greensboro, NC (US); Michael Blackard, Madison, NC (US); John Bate, Oak Ridge, NC (US); Brian Kidd, Greensboro, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 31 days.

(21) Appl. No.: 10/042,609

(22) Filed: Jan. 9, 2002

(65) Prior Publication Data

US 2003/0088348 A1 May 8, 2003

Related U.S. Application Data

(60) Provisional application No. 60/332,934, filed on Nov. 6, 2001.

(51) Int. Cl.[7] .................... G06G 7/78; G01C 22/00
(52) U.S. Cl. .................. 701/35; 701/207; 701/214; 702/96; 342/457
(58) Field of Search ............... 701/35, 29, 207, 701/205, 210, 213, 216, 219, 214; 340/568, 272, 825.54, 990, 995, 988; 702/96; 73/1.37; 342/457

(56) References Cited

U.S. PATENT DOCUMENTS

| | | | | |
|---|---|---|---|---|
| 5,539,647 A | * | 7/1996 | Shibata et al. ............. 701/224 |
| 5,740,049 A | * | 4/1998 | Kaise ........................ 701/217 |
| 5,828,585 A | * | 10/1998 | Welk et al. ................... 702/96 |
| 5,912,635 A | * | 6/1999 | Oshizawa et al. ............ 340/988 |
| 5,987,378 A | * | 11/1999 | Schipper et al. ............ 701/207 |
| 6,011,461 A | * | 1/2000 | Luper ........................ 340/441 |
| 6,011,827 A | * | 1/2000 | Kyrtsos .................... 377/24.1 |
| 6,018,704 A | * | 1/2000 | Kohli et al. ................ 702/149 |
| 6,029,111 A | * | 2/2000 | Croyle ...................... 701/207 |
| 6,029,496 A | * | 2/2000 | Kreft .......................... 73/1.37 |
| 6,087,965 A | * | 7/2000 | Murphy ..................... 340/991 |
| 6,088,650 A | * | 7/2000 | Schipper et al. ............ 701/207 |

* cited by examiner

Primary Examiner—Thomas G. Black
Assistant Examiner—Arthur Donnelly
(74) Attorney, Agent, or Firm—Watts, Hoffmann, Fisher & Heinke Co., L.P.A.

(57) ABSTRACT

A method of providing a vehicle monitoring system for ensuring accurate vehicle mileage readings. A comparison is made between velocity measurements from several sources to detect unauthorized modifications made to a vehicle in an effort to ensure accurate vehicle odometer readings. The vehicle velocity measured on-board is compared with vehicle velocity data signals received from a remote satellite system in light of an allowable tolerance. The system will detect changes in the vehicle such as tire size or tampering with the vehicles on-board measurement devices. The system may communicate out of tolerance conditions to the vehicle operator and the fleet manager.

9 Claims, 1 Drawing Sheet

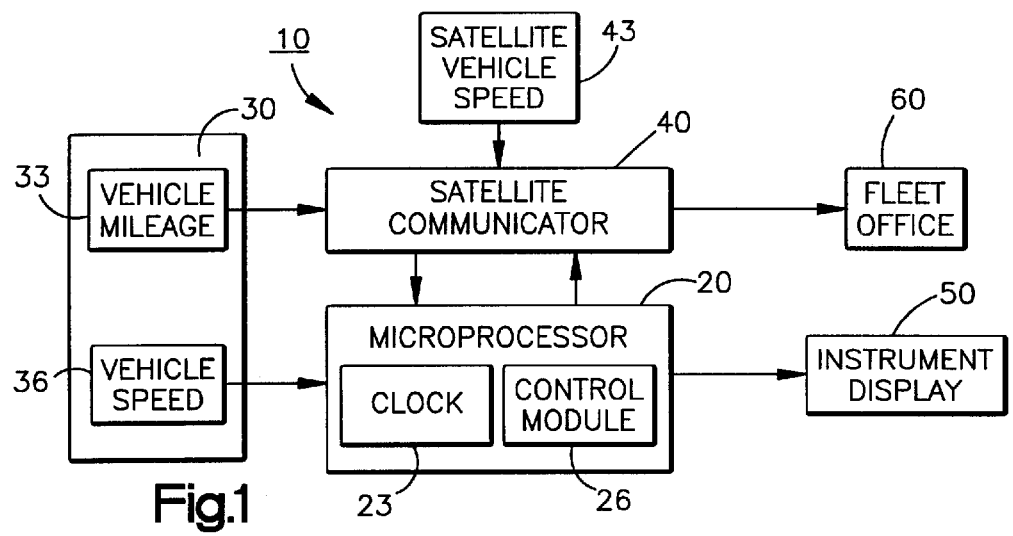
Fig.1
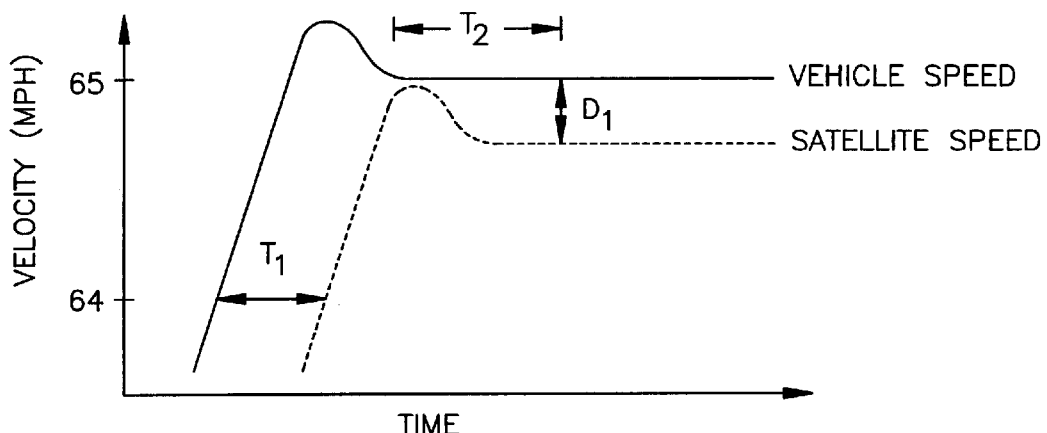
Fig.2
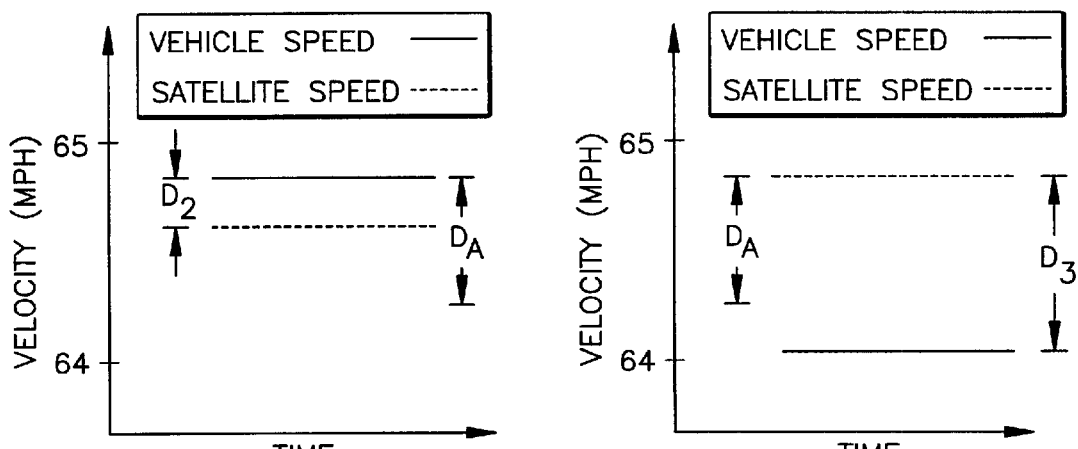
Fig.3A
Fig.3B

VEHICLE TAMPERING PROTECTION SYSTEM

CROSS-REFERENCE TO RELATED APPLICATIONS

This non-provisional application claims benefit of U.S. Patent Provisional Application Ser. No. 60/332,934, entitled "Vehicle Tampering Protection System," filed on Nov. 6, 2001.

FIELD OF THE INVENTION

The invention is directed to a vehicle monitoring system and more particularly is directed to a tampering protection system that compares velocity measurements from several sources to detect unauthorized modifications made to a vehicle.

BACKGROUND OF THE INVENTION

Fleet managers of over-the-highway trucking enterprises are in constant search for more competitive operational plans. Several fleet managers have chosen to offer leased trucks to operators on a "cost per mile" basis, rather than a flat monthly fee. With the advent of "cost per mile" leasing options, fleet managers are required to ascertain the actual mileage use of a vehicle. Depending on the lease terms and billing schedule, the mileage may need to be determined at times when the truck is a great distance from the fleet main office. Visual odometer readings may not be practical. Even when fleet managers can access the truck to read its odometer, the fleet manager may not have total confidence in the odometer reading.

Under a "cost per mile" lease, operators have a financial incentive to under report mileage. Tampering with existing on-board systems has been a significant problem in some cases and further complicates the task of ascertaining actual mileage. Since the distance measurement devices of a vehicle may be tampered with by a driver operating under a "cost per mile" leasing option, the vehicle odometer measurement is no longer reliable. The odometer is also not a reliable method for the purpose of detecting tampering.

The problem of accurate mileage readings is also relevant with honest operators. A seemingly innocuous change to larger tires can result in a 5% revenue decrease to the fleet operator. Alternatively, a customer using 5% smaller tires will be overcharged. A system in which both a fleet manager and a fair-minded operator can have confidence is needed to further the successful development of programs such as "cost-per-mile" leases.

Several vehicle monitoring systems have been patented that use various distant or speed data to monitor the performance and accuracy of certain vehicle measurement systems. An important consideration when designing these systems is the type of data and source of the data to be used. Some designs have used actual on-board vehicle velocity and distant measurements, while others use mathematically calculated data, or data obtained from satellite systems. Another consideration is whether the system is designed for the purpose of calibrating on-board measurement devices or directed to alternate purposes, such as detecting tampering or unauthorized modifications of the vehicle by the operator.

One prior art proposal teaches using information received from a Global Positioning System, or GPS, receiver to detect failures in a vehicle's speed sensor. A vehicle's initial geographic position is determined by a GPS system. During a predetermined period of time, the vehicle speed as measured by the speed sensor is recorded, and after the period elapses, a second geographic position is recorded. Two distance calculations are performed. The first distance calculation is multiplying the vehicle's speed during the period by the elapsed time. The second distance calculation is calculating the linear distance between the initial and ending GPS geographic positions. If the difference between the two distance measurements falls outside of an allowable tolerance, it is assumed the speed sensor is not functioning properly, or conversely, the positioning system may be malfunctioning. The proposal teaches correcting vehicle speed sensor readings, rather than ensuring accurate odometer readings.

Another prior art proposal teaches monitoring the speed and distance traveled of a vehicle using a Location Determination (LD) system, such as a GPS. An embodiment of the invention uses a LD system to record vehicle locations at periods of low or zero speed over a minimum threshold time, known as a "vehicle arrest event." The LD system is used to record distance traveled between "vehicle arrest events." The cumulative distance traveled over any time period can also be obtained, and can be used to calibrate actual odometer readings.

Still another prior art proposal teaches, within a vehicle navigation system, comparing an actual odometer reading with a distance reading obtained from another source, such as a GPS system. An adjustment is performed if the difference between the two readings is more than a threshold level. The adjustment is accomplished by adjusting the pulse rate setting of the vehicle navigation system, so that the distance calculated by the navigational system will match the actual odometer.

Yet another prior art proposal discloses a method for automatically calibrating a displacement sensor in a vehicle. The system ascertains vehicle speed by receiving satellite signal input from a GPS system over a set period of time. The estimated distance traveled over this period is then calculated and compared to signals from the vehicle's displacement sensor which are associated to a distanced traveled. After a series of mathematical calculations are made to determine a correction coefficient, the vehicle's displacement sensor is calibrated.

With the advent of "cost per mile" leasing options offered to truck operators, fleet managers are required to ascertain the actual mileage use of a vehicle. The accuracy of the mileage traveled is important not only for billing purposes, but also to build operator confidence in the "cost-per-mile" leasing operational plan.

Traditional leasing programs also require a leasor to ascertain the actual mileage use of a vehicle. For example, most leasing programs permit a certain amount of use over the term of the lease. Punitive charges are levied for vehicle distance travel over the term limit. These punitive charges provide incentive to some operators to tamper with a vehicle's odometer.

Certain modern truck are equipped with multiple ways to calculate distance travel onboard. For example, a conventional odometer may read distance travel in the instrument cluster, while an engine electronic control unit may calculate mileage as well. The distance readings of the two measurement devices may, not coincide if one or more of the methods has been tampered with or is inoperative.

A need in the market exists for a reliable and relatively inexpensive method to accurately record the mileage use of a vehicle while detecting tampering or unauthorized vehicle alterations.

SUMMARY OF THE INVENTION

The vehicle monitoring system of the present invention provides a method to ensure accurate distance recordings of vehicle travel. The system is directed to detecting tampering or unauthorized modifications made to an over-the-highway truck. The invention is beneficial to fleet managers operating "cost-per-mile" leasing programs in order to determine periodic actual vehicle use, and to leasors operating traditional programs in order to determine actual vehicle use over the term of the lease.

The vehicle odometer data and on-board speed sensor data is recorded in a wireless vehicle communication system. At the same time, vehicle velocity data signals are received from a remote satellite system. In one embodiment, a separate memory unit stores data received by the remote satellite system. Since the satellite signals are not real time data, a duration of stable vehicle velocity is required prior to comparing the satellite and speed sensor velocity values. A velocity difference is calculated between the on-board vehicle speed sensor velocity and the vehicle velocity data signals as received from a remote satellite system. The velocity difference is compared to an acceptable tolerance.

In the preferred embodiment of the invention, a vehicle odometer data is validated during periods of allowable tolerance. The odometer data may be used for billing, preventive maintenance schedules, or other purposes. A display may communicate to the operator of the vehicle out of tolerance and in tolerance status. Out of tolerance conditions are communicated via satellite to a fleet operator, leasor, or an otherwise designated party. The fleet operator may investigate out of tolerance conditions and correct the problem as required.

Further advantages and a fuller understanding of the invention will be had from the accompanying drawings and the detailed description of the invention.

BRIEF DESCRIPTION OF THE DRAWINGS

FIG. 1 is a block diagram of a vehicle monitoring system in accordance with a preferred embodiment the present invention;

FIG. 2 is a line chart depiction of an example of vehicle operation monitored by the vehicle monitoring system of FIG. 1;

FIG. 3A is a line chart depiction of an example of vehicle operation within the allowable tolerance of the vehicle monitoring system of FIG. 1; and FIG. 3B is a line chart depiction of an example of vehicle operation outside the allowable tolerance of the vehicle monitoring system of FIG. 1.

DETAILED DESCRIPTION OF THE PREFERRED EMBODIMENT

Referring to FIG. 1, a block diagram of a vehicle monitoring system 10 for use in a vehicle (not shown) in accordance with the present invention is depicted. A microprocessor 20 receives data from a data bus 30 and a satellite communicator 40 regarding the current velocity of the vehicle. After a duration of relatively stable velocity, a velocity difference is calculated between the vehicle speed signal and satellite speed signal. The velocity difference is compared to an allowable tolerance. Periods of out of tolerance operation may be communicated to a vehicle instrument display 50 and a fleet office 60.

A vehicle mileage signal 33 indicates the distance travel of the vehicle. A vehicle mileage signal 33 is generated from the odometer reading of the vehicle and is input from the data bus 30 to the satellite communicator 40. As shown in FIG. 1, the on-board vehicle speed 33 is inputted to the satellite communicator 40 from the data bus 30. In one preferred embodiment, the vehicle mileage 33 is calculated directly within the satellite communicator 40. During periods of normal operation, the satellite communicator 40 transmits the vehicle odometer reading to the fleet office 60. This data may be used for various purposes, including calculation of fees for "cost-per-mile" leasing programs and scheduling preventative maintenance. In one embodiment, when no out of tolerance conditions are detected, the data is transmitted monthly for monitoring and billing purposes. It will be understood by those skilled in the art that the transmission interval may vary during the practice of the invention. In an alternative embodiment, the interval is selected by fleet office personnel. Out of tolerance conditions that last beyond a certain time duration are reported immediately. This timing scheme will be discussed later in more detail.

A vehicle speed signal 36 indicates the real time velocity of the vehicle. A vehicle speed signal 36 can be generated numerous ways. In one embodiment, wheel sensors can sense wheel rotation, and hence vehicle speed. In alternative embodiments, data regarding transmission gear status or other engine parameters is used to determine the vehicle speed. In either case, the vehicle speed signal generation method may be vulnerable to tampering, unauthorized alterations, or disablement. The vehicle speed signal 36 is input to the microprocessor 20. The vehicle speed signal 36 is also input from the data bus 30 to the satellite communicator 40, either directly or via the microprocessor 20. The vehicle speed signal 36 also may form the broadcast datalink speed that is communicated with the fleet office 60.

A satellite vehicle speed signal 43 indicates the velocity of the vehicle as detected by a satellite system, such as a Global Positioning System (GPS), and is input to the satellite communicator 40. The satellite communicator 40 inputs the satellite vehicle speed signal 43 to the microprocessor 20. As shown in FIG. 1, in one embodiment the microprocessor 20 is a separate unit from the satellite communicator 40. Alternatively, the microprocessor 20 may be integrated within the satellite communicator 40.

The microprocessor 20 features an internal clock 23. A control module 26 calculates a velocity difference between the vehicle speed signal 36 and the satellite vehicle speed signal 43. After a timed duration of constant velocity, the calculated velocity difference is compared to an allowable tolerance. This step will be more illuminated by FIGS. 2 and 3. Periods of out of tolerance operation are communicated to the vehicle instrument display 50 and the fleet office 60. During periods of allowable tolerance, the vehicle mileage signal 33 indicating the vehicle odometer reading is transmitted by the satellite communicator 40 to the fleet office 60.

FIG. 2 is a line graph depicting an operation period of allowable tolerance of a vehicle. FIG. 2 depicts a period of start up, acceleration and deceleration of a vehicle to a constant velocity. The vehicle speed sensor signal and the satellite vehicle speed signal are graphed over time. In a preferred embodiment, the satellite vehicle speed signal is generated by a GPS. Although the vehicle speed signal is real time, the GPS signal is delayed for a short duration $T_1$. The duration $T_1$ is shown in FIG. 2. Despite the relative sophistication of the vehicle speed sensors and the GPS, a velocity difference $D_1$ typically exists between the systems. Certain minor values of a velocity difference $D_1$ are expected, but excessively abnormal values may indicate system tampering or inoperative equipment.

After the vehicle velocity is constant for a length of time $T_2$, as timed by the internal clock 23, the velocity difference $D_1$ is calculated. In one embodiment, the vehicle velocity must also be above a certain threshold prior to any comparison is made. In the preferred embodiment, the vehicle speed signal is monitored to determine a stable velocity condition. $T_2$ is greater than the delay duration $T_1$, and may be set to a desired value by the fleet operator. Next, the velocity difference $D_1$ is compared to an allowable tolerance. In a preferred embodiment, the allowable tolerance can be preset to a desired value by the fleet operator. In one embodiment, the velocity difference $D_1$ may be a statistical representation of many calculations taken over a set period of time.

FIGS. 3A and 3B are line graphs depicting two operational periods of a vehicle. As shown in FIG. 3A, after a timed period of constant vehicle velocity, a velocity difference $D_2$ is calculated from the vehicle velocity signal and the satellite velocity signal. In one embodiment, a constant velocity above a minimum threshold is also required. For example, the vehicle must be traveling above 30 mph. As shown, the absolute value of a velocity difference $D_2$ is less than an allowable velocity difference $D_A$. In the preferred embodiment, the allowable velocity difference $D_A$ can be preset to a desired value by the fleet operator. In FIG. 3A, the velocity difference $D_A$ is represented as about 0.5 mph. It should be appreciated by those skilled in the art that other values of a velocity difference $D_A$ can be used. For example, the fleet operator may have the option of selecting an allowable percentage tolerance. The velocity difference $D_A$ may be expressed as a percentage difference calculated from the vehicle velocity signal and the satellite velocity signal. For example, velocity difference $D_A$ may be 5%, meaning whenever the satellite velocity signal was 5% greater or lesser than the vehicle velocity signal, an out of tolerance condition would result.

An out of tolerance condition is shown in FIG. 3B. The absolute value of a velocity difference $D_3$ is greater than the allowable velocity difference $D_A$. In the preferred embodiment, a message is communicated to the vehicle operator on a vehicle instrument display. An operator will be aware that the system has detected an out of tolerance condition. A culpable operator will be on notice that any unauthorized tampering or disablement has been detected. Meanwhile, a message is communicated to the fleet office that the system has detected an out of tolerance condition. The value of the velocity difference $D_3$ can be reported to the fleet office. The control unit monitors the time duration of the out of tolerance condition. This time duration can also be reported to the fleet office. The fleet office may remotely contact the vehicle and pursue an investigation into the out of tolerance condition.

The triggering and frequency of the comparison calculations may be controlled by user programming within the satellite communicator. In one preferred embodiment, a user may determine a reporting period in which to receive tampering reports. The selection of a reporting period allows a user to control the frequency in which out of tolerance conditions are reported. As a result, users may tailor the reporting frequency to their own ability and resources to respond to the conditions. For example, one user may want out of tolerance reports hourly, while another may only wish to receive reports weekly. Absent user selection, the report period may be set to a default value, say 24 hours.

If additional out of tolerance conditions occur during the established default period, additional reports are not set. Rather, another report is sent at the end of the reporting period. Regardless, the satellite communicator resets at the end of the reporting period, and the comparison process restarts. This method step reduces the number of communications and the total time in which the communication system is utilized. This results in a cost savings to the user and fleet office. The step further provides a reasonable opportunity to investigate and correct the out of tolerance condition prior to sending additional tampering messages.

The preferred embodiments of the invention have been illustrated and are described in detail. However, the present invention is not to be considered limited to the precise construction disclosed. Various adaptations, modifications and uses of the invention may occur to those skilled in the art to which the invention relates and the intention is to cover hereby all such adaptations, modifications and uses which fall within the spirit or scope of the appended claims.

What is claimed is:

1. A method of providing a vehicle monitoring system for ensuring accurate vehicle distance travel data comprising the steps of:
   recording vehicle odometer data in a wireless communication device;
   receiving vehicle velocity data signals from a remote satellite system;
   measuring vehicle velocity after a duration of vehicle operation at a substantially stable speed;
   calculating a velocity difference between a vehicle velocity measured on-board and a vehicle velocity as determined from data signals received from a remote satellite system; and
   communicating any condition whereby an absolute value of said velocity difference is greater than an allowable tolerance.

2. The method of claim 1 comprising the step of validating vehicle odometer data during periods of allowable tolerance, whereby vehicle odometer data is transmitted by said satellite communication device to a vehicle fleet office.

3. The method of claim 1 comprising the step of validating vehicle odometer data during periods of allowable tolerance, whereby vehicle odometer data is transmitted by said satellite communication device to a vehicle fleet office at vehicle fleet office selected intervals.

4. The method of claim 1 comprising the step of communicating any condition wherein said velocity difference is greater than an allowable tolerance to a vehicle fleet manager.

5. The method of claim 1 comprising the step of communicating any condition wherein said velocity difference is greater than an allowable tolerance to a vehicle fleet manager, whereby not more than one communication is made during a reporting period.

6. The method of claim 5 wherein the duration of said reporting period is determined by a vehicle fleet manager.

7. The method of claim 1 comprising the step of communicating any condition wherein said velocity difference is greater than an allowable tolerance to a vehicle operator.

8. The method of claim 1 comprising the step of communicating any condition wherein said velocity difference is within an allowable tolerance to a vehicle operator.

9. A computer readable medium containing instructions for performing a method of providing a vehicle monitoring system for ensuring accurate vehicle distance travel data comprising the steps of:
   recording vehicle odometer data in a wireless communication device;
   receiving vehicle velocity data signals from a remote satellite system;

measuring vehicle velocity after a duration of vehicle operation at a substantially stable speed;

calculating a velocity difference between a vehicle velocity measured on-board and a vehicle velocity as determined from data signals received from a remote satellite system; and communicating any condition whereby an absolute value of said velocity difference is greater than an allowable tolerance.

* * * * *